United States Patent
McPherson

[11] 3,895,145
[45] July 15, 1975

[54] CORNER MOLDING

[76] Inventor: Neil Soden McPherson, 1162 W. 26th Ave., Vancouver, British Columbia, Canada

[22] Filed: Mar. 8, 1973

[21] Appl. No.: 339,440

[52] U.S. Cl. .................. 428/53; 428/358; 52/273; 52/242
[51] Int. Cl.² ................ B32B 3/10; B32B 3/16
[58] Field of Search ............ 52/273, 242, 624; 117/122 PF, 122 PA; 161/60, 140, 142, 143, 161/144, 166, 406 T

[56] References Cited
UNITED STATES PATENTS

| | | | |
|---|---|---|---|
| 3,034,941 | 5/1962 | Hessenthaler | 161/143 |
| 3,408,250 | 10/1968 | Finefrock | 52/273 X |
| 3,556,918 | 1/1971 | Lemelson | 161/55 |
| 3,565,737 | 2/1971 | Lefevre | 161/36 |
| 3,616,113 | 10/1971 | Sawyer | 52/273 X |
| 3,652,371 | 3/1972 | Hirata | 161/36 |
| 3,708,379 | 1/1973 | Flint | 161/36 |

*Primary Examiner*—Mayer Weinblatt
*Assistant Examiner*—Edith R. Buffalow
*Attorney, Agent, or Firm*—Carver and Company

[57] ABSTRACT

Corner molding which is formed of a pair of longitudinally extending strips of semi-rigid plastic material extending in spaced side by side relationship, adjacent edges of the strips being integrally connected to a strip of flexible easily bendable plastic material so that the semi-rigid strips can be angularly disposed to conform to corners of surfaces to be covered.

1 Claim, 7 Drawing Figures

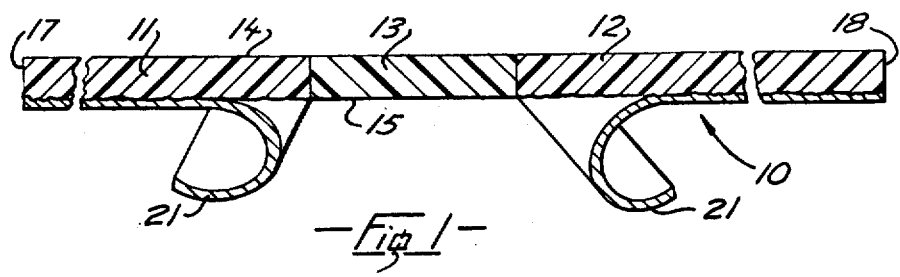
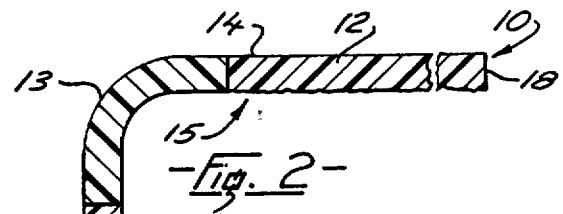
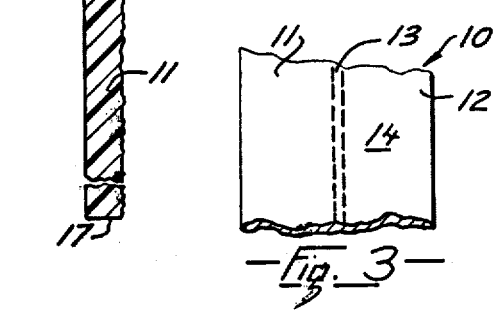
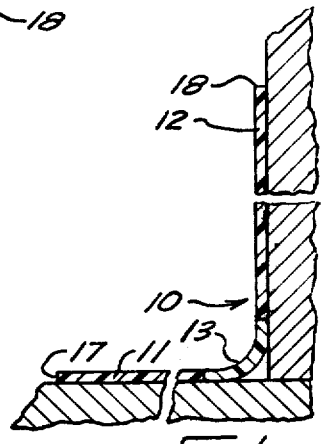
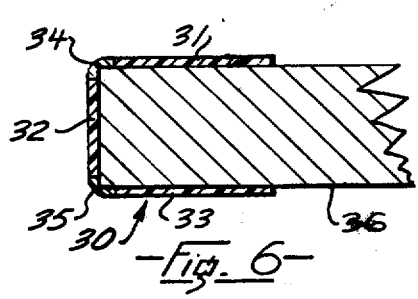
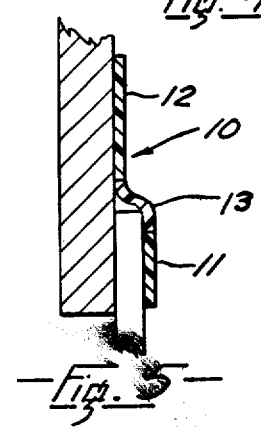
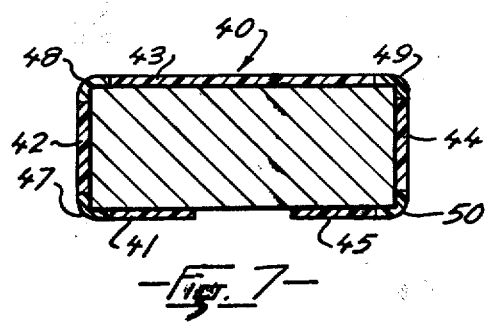

CORNER MOLDING

BACKGROUND OF THE INVENTION

1. Field of the Invention

This invention relates to protective and decorative molding for covering adjoining surfaces of walls, doorway casings, shelving and the like.

2. Prior Art

Corner molding, in the past, have usually been made from rigid materials such as wood, metal or rigid thermoplastics which thus necessitates varies shapes to fit inside and outside corners. A high degree of expertise is required to install this type of molding, particularly in cutting and fitting mitered corners. Where adjoining surfaces at corners are true and at 90° to each other excellent straight line fit is obtained with use of such rigid materials however, their rigidity precludes absolute fit where angular deviations of the adjoining surfaces occur. Furthermore, specially cut or molded corner molding is required where the surfaces are not at 90° to each other.

Wooden moldings are relatively expensive, easily broken and marred in handling and are bulky to store. Plastic and metal molding though offering greater resistance to marring and breakage are also unweildy to ship and store and difficult to miter and match.

Some attempts have been made to use highly flexible sheet thermoplastic as molding. Flexible material of this nature can adapt itself to angular and linear deviation of adjacent adjoining surfaces. However, it usually stretches unevenly during application resulting in wrinkles and wavy edge.

Some attempts have been made to provide a type of plastic molding which retains the benefit of rigid materials in obtaining straight line edges and yet which is also sufficiently flexible to suit angular and linear deviations of adjacent surface. Some of the last mentioned types are constructed of a semi-rigid plastic which is scored lengthwise to provide a fold line along which a strip can be bent. This type can partially accommodate angular deviation of adjacent surfaces but prove difficult to follow linear deviation. Furthermore, the material is liable to break at the fold line. Others of this type are of laminar construction in which semi-rigid strips of thermoplastic material extending in spaced side by side relationship are overlaid by a thin strip of thermoplastic material which is secured by a fusion or by some bonding adhesive so as to obtain necessary flexibility to accommodate linear and angular deviation of adjacent surfaces without sacrificing rigidity for obtaining straight line edges. This type, however, due to its laminar construction is relatively expensive to produce, must be relatively thick as the semi-rigid and flexible material are in different planes and unless the flexible material is relatively thick, wrinkles during application.

SUMMARY OF THE INVENTION

The present invention provides corner molding of thermoplastic material which is relatively inexpensive to produce, and has sufficient flexibility to conform to angular and linear deviations of adjacent surfaces to be covered. It can easily be applied in an unwrinkled condition yet provides the desired straight line edge.

The corner molding of the present invention, furthermore can be provided in strips which can be rolled and thus are easily transportable and stored and can be cut in desired lengths for application.

The corner molding of the present invention includes a plurality of flat strips of semi-rigid thermoplastic material having parallel side edges extending in spaced parallelism, and a strip of flexible thermoplastic material extending between and connected to adjacent side edges of the parallel strips for enabling the angular disposition of the semi-rigid strips.

A detailed description following related to the drawings, gives exemplification of apparatus according to the invention which, however, is capable of expression in means other than particularly described and illustrated.

DESCRIPTION OF THE DRAWINGS

FIG. 1 is a transverse section of a strip of corner molding in accordance with the invention FIG. 2 shows disposition of the corner molding of FIG. 1 in a bent condition, FIG. 3 is a plan view, much reduced, of a strip of corner molding, FIGS. 4, 5, 6, and 7 are transverse sectional views of varied embodiments of corner molding of the invention shown in varied applications.

DETAILED DESCRIPTION

Referring to the drawings and in particular to FIGS. 1, 2, and 3, one embodiment 10 of corner molding in accordance with the invention is shown. The corner molding 10 has a pair of flat strips 11 and 12 of semi-rigid thermoplastic material, for example, a polyethylene or a vinyl, between which, a flat strip 13 of flexible thermoplastic of the same type and thickness extends. Adjacent edges of the strips 11, 12 and 13 are heat welded so that the molding is of substantially integral construction having unbroken upper and lower surfaces 14 and 15 respectively. Methods of heat welding material of this type are well known and require no further description.

The strips 11, 12 and 13 can be extruded sections and contain suitable plasticisers which can be adjusted to provide required characteristics of rigidity and flexibility. The strips 11 and 12 have sufficient flexibility to permit the molding to conform to minor linear deviations of surfaces to which the molding is applied and to enable the molding to be rolled lengthwise to facilitate storage. The strips 11 and 12 must have sufficient rigidity so that outer edges 17 and 18 thereof maintain a straight line configuration without wrinkling. The center strip 13 must have sufficient flexibility to enable the outer strips 11 and 12 to be disposed to conform to angularly related surfaces.

In practice the molding can be of any desired thickness. It will be noted however that due to the non-laminar construction molding can be very thin, e.g. 20 to 40 mils in thickness. The center strip 13 is normally about onequarter inches in width. Width of the outer strips 11 and 12 can be varied to suit requirements of use. The molding can be extruded in varied widths, and depending upon thickness and hardness of the semi-rigid strips can be cut with scissors or knife.

The undersurfaces 15 of the strips 11 and 12 are preferably coated with a suitable pressure sensitive adhesive normally covered by removable protective strips 21-21 which, when the molding is to be used, can be stripped away to expose the adhesive.

As shown in FIG. 4 the molding 10 can be used as a cove base, the rigid strips 11 and 12 being secured to the wall or the floor, respectively, with the flexible strip at the inner corner.

FIG. 5 illustrates the use of the molding 10 as a cap molding, the flexible strip 13 permitting parallel disposition of strips 11 and 12.

FIG. 6 illustrates another embodiment 30 of corner molding in accordance with the invention which is used as shelf edging.

The molding 30 has three semi-rigid strips 31, 32, and 33 which are joined by flexible strips 34 and 35, the molding being secured to the shelf 36 by a suitable adhesive as previously described. The flexible strips 34 and 35 need not be centered on the corners of the shelf thus a corner molding strip in which the center strip 32 is, say half inch in width, can fit shelves between one half inches and one inch in thickness.

FIG. 7 shows another embodiment 40 of molding in accordance with the invention. Molding 40 is used as a cover for dimension lumber and has five strips 41, 42, 43, 44, and 45 of rigid sheet thermoplastic which are joined in the manner aforesaid by flexible strips 47, 48, 49, and 50. Molding 40 is of particular advantage, for instance where lumber is used as a top plate on fences or picnic tables where frequent finishing is normally required.

It will be understood that in all embodiments of the invention the thermoplastic material used in the molding can be provided in suitable colours to fit decor of the structure to which they are applied.

I claim:

1. Corner moulding for application to angularly connected planar surfaces comprising:
    a. a pair of parallel planar strips of semirigid thermoplastic material,
    b. a connecting strip of flexible thermoplastic material parallel to, and positioned between, said semi-rigid strips,
    c. the edges of said semi-rigid strips being fused to the adjacent edges of said connecting strips so that said moulding has longitudinally extending rigid areas separated by a coextensive flexible area,
    d. a pressure sensitive adhesive coating on one side of said semi-rigid strips,
    e. whereby said semi-rigid strips may be adhered to said planar surfaces while said connecting strip conforms generally to the angular connection between said planar surfaces without wrinkling.

* * * * *